Patented July 9, 1929.

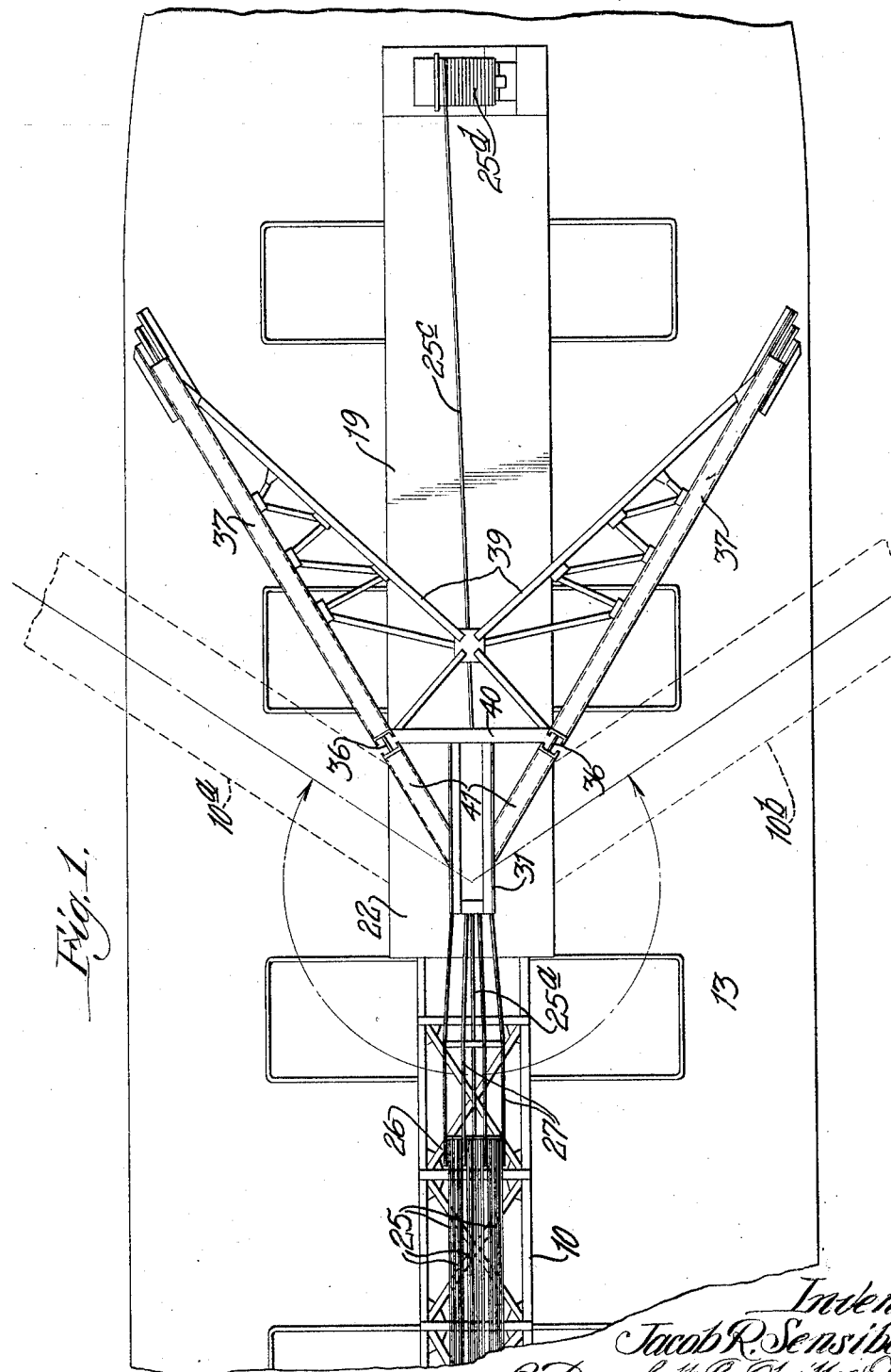

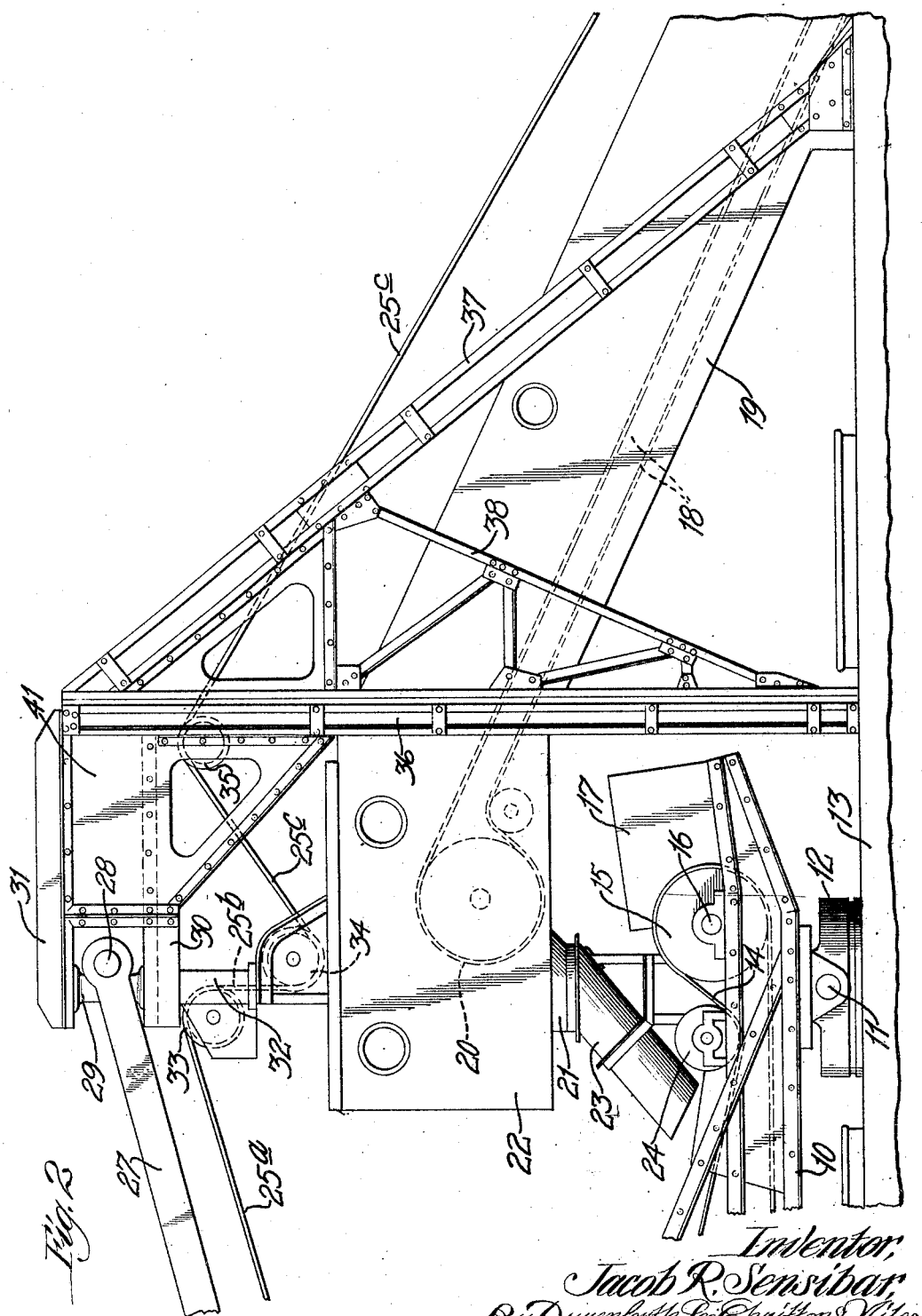

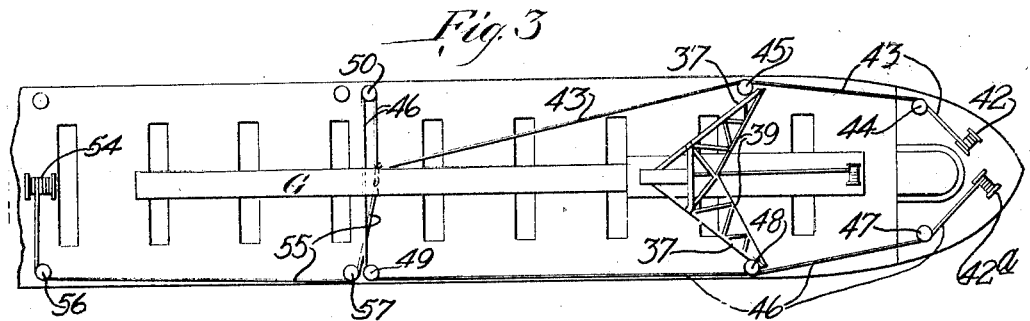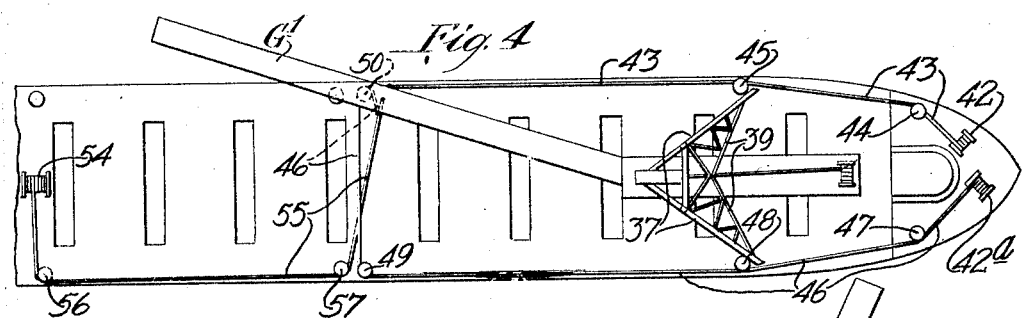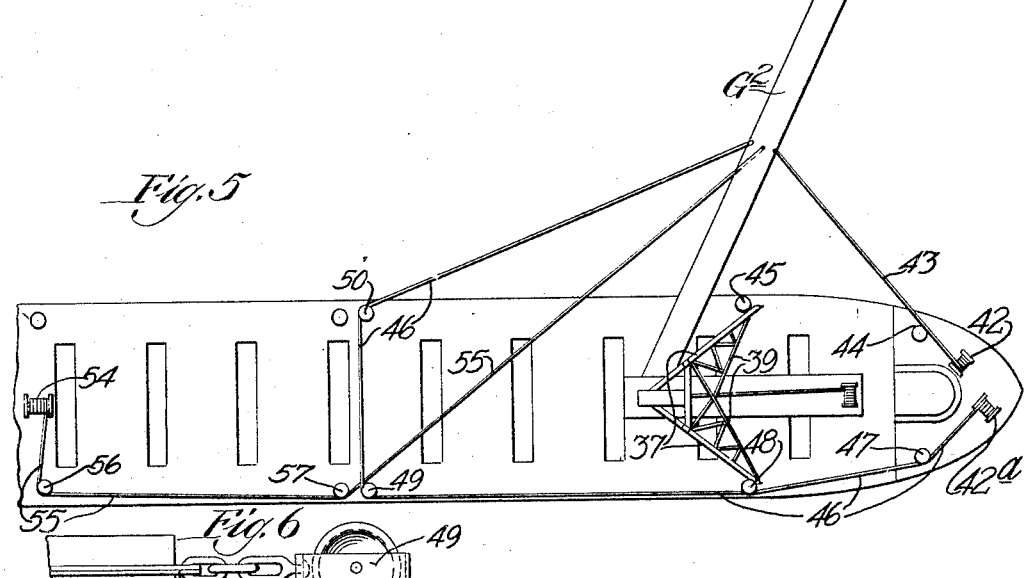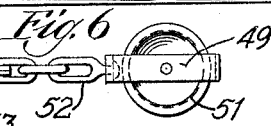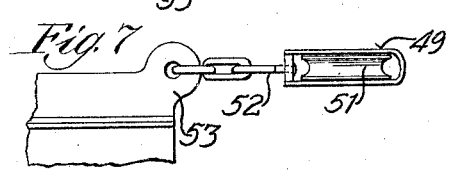

1,720,450

UNITED STATES PATENT OFFICE.

JACOB R. SENSIBAR, OF CHICAGO, ILLINOIS.

UNLOADING BOOM FOR SHIPS AND SUPPORT THEREFOR.

Application filed July 20, 1927. Serial No. 207,261.

This invention relates to unloading booms for ships and the like and to a support for the same.

The primary object of the invention is to provide an unloading boom for ships together with a mounting therefor which will permit the boom to swing through considerable more than 180° of arc about its vertical pivot. Booms of this general type have heretofore been made which carry an endless belt conveyor for unloading material from a boat, but such booms have had a very restricted movement of 180°, or usually less.

This and other objects as will hereinafter appear, are accomplished by this invention which is fully described in the following specification and shown in the accompanying drawings, in which:

Figure 1 is a top plan view of the forward end of a boat with a boom and support embodying this invention;

Fig. 2 is a side elevation of the same;

Fig. 3 is a plan view of the forward end of the boat showing the tackle for swinging the boom, the boom here being in the middle position;

Fig. 4 is a similar view showing the boom swung partly outwardly;

Fig. 5 is a similar view showing the boom swung outwardly as far as possible on the port side; and Figs. 6 and 7 are front and side elevations of a sheave-block used on said tackle.

The embodiment illustrated comprises a boom 10 which is supported at the inner end on trunnions 11 which are carried by a turntable 12 on the deck 13. The boom 10 carries a belt conveyor 14 which runs over a tail pulley 15 which is mounted on the tail shaft 16. This shaft and pulley are driven by a suitable motor, not shown, within the housing 17. Material to be unloaded from the boat is carried by means of a belt conveyor 18 within the housing 19 which delivers over the head pulley 20 to the hopper 21 which is carried by the housing 22. The hopper 21 is circular and delivers to a chute 23 which is carried by the boom 10 and which delivers to the belt conveyor 14 after it passes under the idler pulley 24.

The outer end of the boom 10 is carried by strands of steel rope 25 which run over the pulley block 26 which is carried by the tension member 27 which is pivotally mounted at 28 on the vertical pivot 29 which, in turn, is mounted in suitable bearings carried by the members 30 and 31. The pivot 29 also carries an extension 32 which has a sheave 33. 34 indicates a sheave carried by an A-frame hereinafter described so that the last strand 25ª of the steel rope passes over the sheave 33 and under the sheave 34 with substantially a vertical section 25ᵇ therebetween which lies on the axis of the pin 29 and of the turntable 12. The steel rope then continues as 25ᶜ passing over the pulley 35 and on to a suitable hoist 25ᵈ.

The main boom support is an A-frame which carries the members 30 and 31, which consists of two frames each of which has a preferably vertical post 36 and an inclined leg 37 attached to the post at its upper end, the two being secured to the deck 13 which, of course, has a suitable construction for carrying the same. These are further strengthened by suitable vertical supports 38 (Fig. 2) and lateral supports 39 (Fig. 1), and the two frames are suitably tied together by cross braces 40.

The two frames each having a post 36 and a leg 37 are set some distance apart with the legs 37 diverging as shown at Fig. 1, at an angle which is less than 90°. Converging members 41, as shown in both figures, connect the posts 36 rigidly with the members 30 and 31 so as to form a rigid support for the pivot 29.

This arrangement of the boom and support enables the boom to be swung to an angle of considerably more than 180° as shown by the dotted lines 10ª, 10ᵇ. Thus this arrangement enables the boat to reach points for delivery from the conveyor on the boom 10 which would be totally inaccessible to boats having booms of limited movement such as heretofore have been used for this purpose.

In Figs. 3 to 5 is shown a form of tackle for swinging the boom which enables the operator to keep it under control at all times. This consists of two windlasses 42 and 42ª preferably located in the bow of the boat and near each other so that the operator, standing between them, can control both at the same time.

A rope 43 from the windlass 42 passes around a guide or pulley 44, around a similar pulley 45 near the foot of the leg 37, and is attached to the boom near the middle. The rope 46 from the windlass 42ª likewise passes over pulleys 47 and 48, thence around the pulley blocks 49 and 50, shown in Figs. 6 and 7, and thence back and is attached to the boom near its middle.

The block 49 carries a sheave 51 (Fig. 6) and is swivelly attached to a link 52 of a chain which is secured to a post 53. This permits the pulley to adjust itself to any angular position of the rope and to turn as the boom passes over the pulley, as shown in Fig. 4.

Another windlass 54 has a rope 55 running over pulleys 56 and 57 and secured to the boom G so that it preferably pulls in the same general direction as the rope 46.

With the boom G in the position shown in Fig. 3, to move it outwardly on the port side, the operator reels in on the windlass 42, drawing the boom G over to the position G′ of Fig. 4, at the same time keeping the windlass drawn up so as to keep the slack out of the rope 43.

As the boom G² passes the pulley 50, the operator reverses the windlass 42ª and reels in on the windlass 42, thereby drawing the boom G′ over until it assumes the desired position which may be that of G², in which it is at the extreme limit of its swing in that direction.

During this operation, another operator reels out on the windlass 54, keeping a slack rope but ready to assist the rope 46 if need be in holding back on the boom.

While I have shown and described but a single embodiment of this invention, it is to be understood that it is capable of many modifications. Changes, therefore, in the construction and arrangement may be made which do not depart from the spirit and scope of the invention as disclosed in the appended claim.

I claim:

In a ship; a deck; a turntable mounted on the deck; a boom having its inner end pivotally attached to the turntable; a boom-supporting frame rising from the deck, said frame being V-shaped in plan with the point of the V lying substantially above the axis of the turntable, and carrying a bifurcated member at said point; a pivoted member carried by said bifurcated member on a vertical axis substantially above the axis of the turntable; a sheave carried by said pivoted member and a sheave carried by said frame, the axis of the turntable and the pivoted member being substantially tangential to said first-mentioned sheave on the inside and tangential to said second-mentioned sheave on the outer side; and a cable placed between the outer end of the boom and said pivoted member, one end of said cable passing over said sheaves with the strand between the same lying substantially in line with the axis of said pivoted member and said turntable.

In testimony whereof I have hereunto set my hand this 15th day of July, 1927.

JACOB R. SENSIBAR.